United States Patent [19]

Ezra et al.

[11] Patent Number: 5,666,226

[45] Date of Patent: Sep. 9, 1997

[54] OPTICAL APPARATUS

[75] Inventors: David Ezra; Graham J. Woodgate; Paul May; Michael G. Robinson; Jonathan Harrold, all of Oxfordshire, United Kingdom

[73] Assignee: Sharp Kabushiki Kaisha, Osaka, Japan

[21] Appl. No.: 248,151

[22] Filed: May 24, 1994

[30] Foreign Application Priority Data

May 25, 1993 [GB] United Kingdom ............... 9310738

[51] Int. Cl.$^6$ ........................................ G02B 27/10
[52] U.S. Cl. .......................... 359/621; 359/272; 349/95
[58] Field of Search ........................... 359/457, 456, 359/621, 622, 623, 624, 277; 349/61, 95

[56] References Cited

U.S. PATENT DOCUMENTS

| | | | |
|---|---|---|---|
| 3,597,069 | 8/1971 | Heinonen | 353/84 |
| 3,704,930 | 12/1972 | McMahon | 359/19 |
| 4,082,415 | 4/1978 | Brooks et al. | |
| 4,957,351 | 9/1990 | Shioji | 350/343 |
| 4,959,641 | 9/1990 | Bass et al. | 340/700 |
| 5,036,385 | 7/1991 | Eichenlaub | 358/3 |
| 5,349,379 | 9/1994 | Eichenlaub | 348/59 |
| 5,410,345 | 4/1995 | Eichenlaub | 348/59 |

FOREIGN PATENT DOCUMENTS

| | | |
|---|---|---|
| 0301715 | 2/1989 | European Pat. Off. . |
| 0465171 | 1/1992 | European Pat. Off. . |
| 0570179 | 11/1993 | European Pat. Off. . |
| 0597629 | 5/1994 | European Pat. Off. . |
| 1233417 | 9/1989 | Japan . |
| 3056922 | 3/1991 | Japan . |
| 2206763 | 1/1989 | United Kingdom . |
| WO94/06249 | 3/1994 | WIPO . |

OTHER PUBLICATIONS

J.B. Eichenlaub; SPIE, vol. 1910/259, Jul. 1993, "A Unique Photonics System Design that Increases the Resolution of an LCD".

Primary Examiner—Georgia Y. Epps
Assistant Examiner—Thomas Robbins

[57] ABSTRACT

An optical apparatus of this invention comprises a first spatial light modulator, an array of imaging elements, and a plurality of light sources, and an image surface. Each of the imaging elements of the array is arranged to form an image of the plurality of light sources via the spatial light modulator at a respective position on the image surface.

43 Claims, 7 Drawing Sheets

OPTICAL APPARATUS

The present invention relates to an optical apparatus. Such an apparatus may be used to increase the resolution of a spatial light modulator (SLM) for display or printing applications.

EP-A-0 301 715 discloses a display in which red, green and blue light sources are disposed behind liquid crystal devices acting as optical shutters. The shutters are controlled to allow the red, green and blue light sources to be presented in sequence to a spatial light modulator so as to build a full colour image.

GB 2 206 763A discloses an autostereoscopic display apparatus in which the position of an illuminator with respect to a spatial light modulator is moved so as to image views indifferent directions.

A known spatial light modulator comprises a two-dimensional array of picture elements (pixels). Each pixel comprises a liquid crystal device whose transmissivity to optical radiation such as light can be individually controlled. Thus, when a light source is placed behind the SLM, light passing through the SLM is spatially modulated by controlling the transmissivity of the pixels. Such an arrangement may be used as part of a display or printing apparatus with the pixels of the SLM being modulated so as to represent image data to be displayed or printed.

The size and maximum resolution of the SLM are limited by practical considerations during manufacture. The resolution is limited by the minimum size of pixel which can be provided, for instance by liquid crystal technology. The maximum size of SLM and the maximum resolution are limited by manufacturing yields which can be economically obtained. For large size high resolution SLM's, the manufacturing yields are relatively low so that the cost of such SLMs is high. The maximum resolution is further limited by the minimum size of liquid crystal pixel which can be manufactured.

According to a first aspect of the invention, there is provided an apparatus as defined in the appended Claim 1.

According to a second aspect of the invention, there is provided an apparatus as defined in the appended Claim 13.

Preferred embodiments of the invention are defined in the other appended claims.

It is thus possible to provide an apparatus in which the resolution of a SLM is effectively increased without the need to reduce the size of the pixels. Thus, relatively large high resolution display and printing arrangements can be provided without the problems of poor manufacturing yield which are associated with large SLMs in which the pixel size is reduced.

The invention will be further described, by way of example, with reference the accompanying drawings, in which.

Throughout the drawings, like reference numerals refer to corresponding parts.

Figure 1:
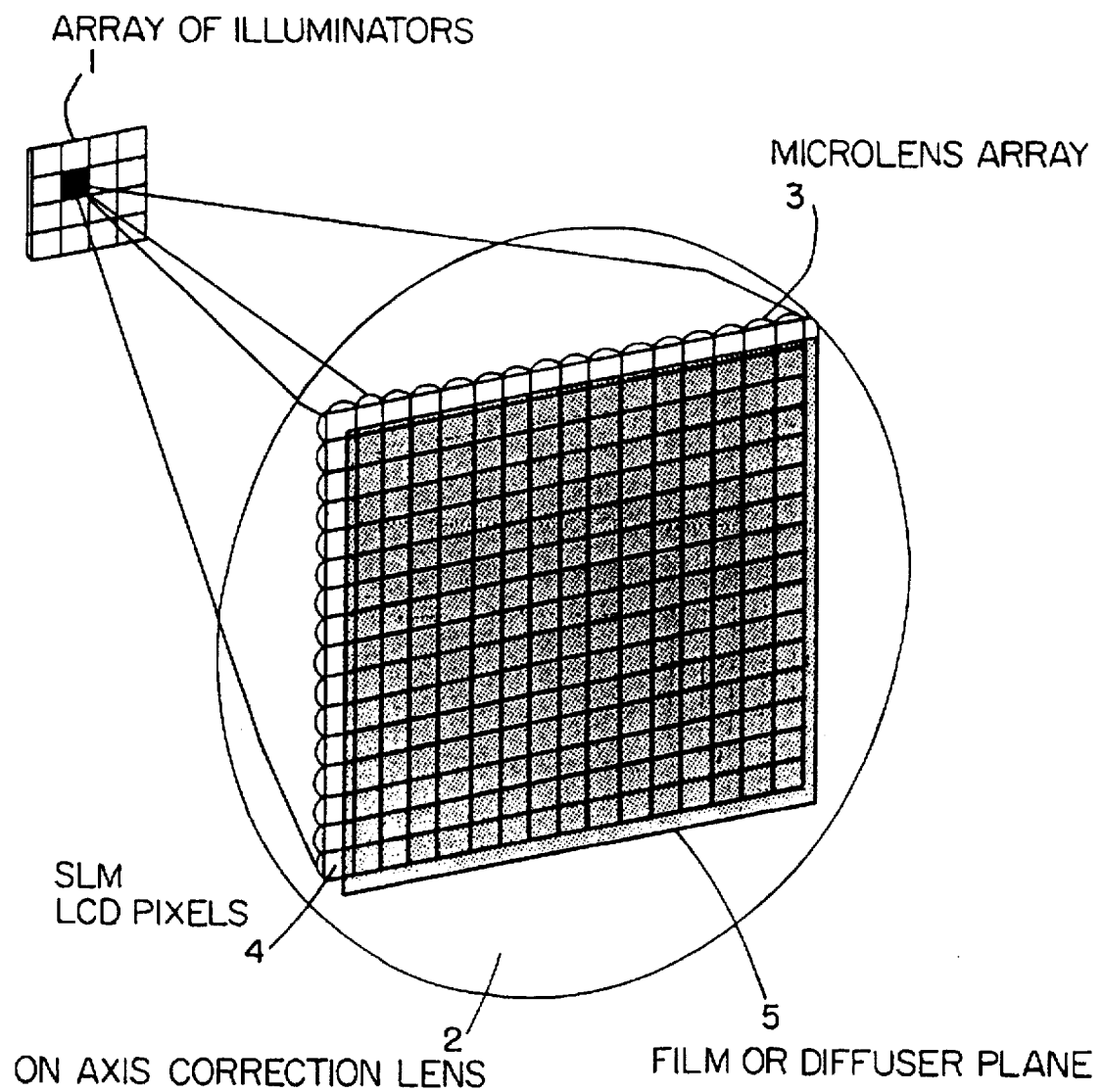
FIG. 1 is a diagrammatic perspective view of an optical apparatus constituting a first embodiment of the invention.
Figure 2:
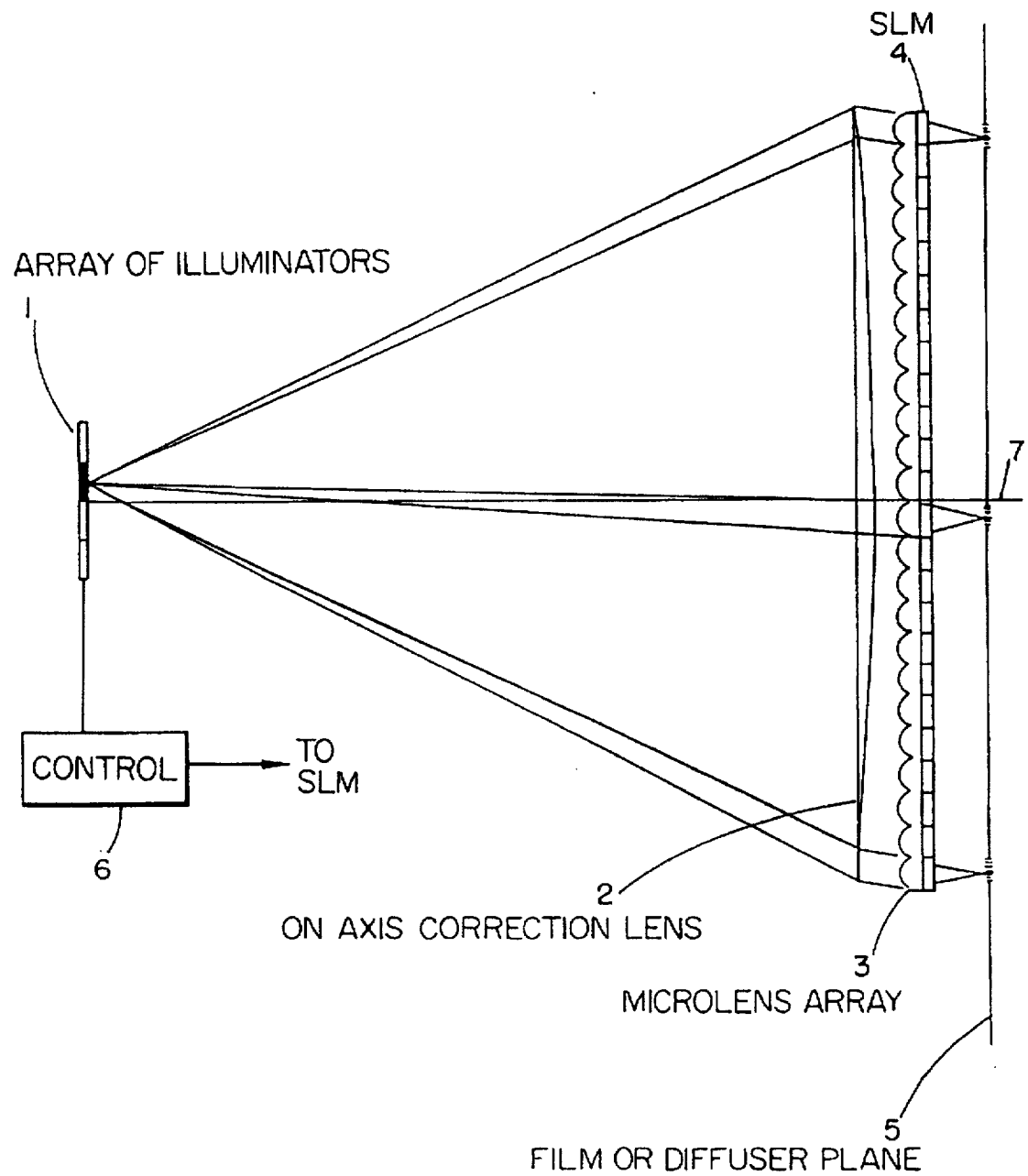
FIG. 2 is a diagrammatic cross-sectional view of the apparatus of FIG. 1.

The optical apparatus shown in FIGS. 1 and 2 comprises an array of $M_x \times M_y$ illuminators 1. By way of example, the array is shown as comprising 4×4 illuminators, each of which comprises an individually controllable light source. The array 1 is located in the focal plane of an on axis correction lens 2 which comprises a converging lens. Although the lens 2 is shown as a piano-convex lens in the drawings, the lens may comprise a Fresnel lens or any other suitable collimating system capable of producing a parallel output beam for each point source of the array 1 of illuminators.

The lens 2 directs light from the array 1 towards a micro-lens array 3 and a spatial light modulator (SLM) 4. The micro-lens array 3 and the SLM 4 comprise regular two-dimensional arrays of elements with each pixel of the SLM 4 corresponding to and being optically aligned with a respective micro-lens of the array 3. Each of the micro-lenses comprises a converging lens and may be of the plano-convex type or of the graded refractive index (GRIN) type. Each of the array 3 and the SLM 4 comprises $N_x \times N_y$ elements arranged as a rectangular array.

An image plane is located in the focal plane of the micro-lenses of the array 3. Depending on the application of the optical apparatus, a diffuser or a photographic emulsion 5 is located in the image plane. Thus, for use as a real time display, the diffuser is located in the image plane. For printing applications a photographic emulsion supported on a substrate such as a film or plate is located at the image plane.

The illuminators of the array 1 and the SLM 4 are controlled by a control circuit 6 shown in FIG. 2. The control circuit controls the array 1 such that the illuminators are illuminated one at a time in a repeating sequence. The SLM 4 is of the liquid crystal type in which each pixel is a liquid crystal cell whose transmissivity is individually controllable by the control circuit 6. Depending on the application, each pixel of the liquid crystal SLM may be switchable between being transparent and opaque, may be switchable among a plurality of different transmissivities, or may provide a transmissivity which is substantially continuously controllable between transparent and opaque. For printing applications where speed is not of critical importance, twisted nematic liquid crystal devices may be used for the pixels of the SLM 4. For real time displays where the frame rate is required to be relatively high, ferroelectric liquid crystal technology may be used to provide the liquid crystal pixels.

In use, the control circuit 6 illuminates one of the illuminators of the array 1 while simultaneously presenting a frame of image data to the SLM so that the transmissivity of the liquid crystal pixels represents the image data. Light from each point of the illuminated illuminator of the array 1 is collimated by the lens 2 into a parallel beam which is focused by the micro-lenses of the array 3 through the respective pixels of the SLM 4 at the image plane 5.

Each of the micro-lenses of the array 3 thus forms at the diffuser 5 an image of the illuminated illuminator whose brightness or intensity is controlled by the transmissivity of the corresponding liquid crystal pixel.

The control circuit 6 then extinguishes the illuminator and illuminates a next illuminator of the array 1 in the sequence of illumination. Simultaneously, the control circuit 6 presents the next frame of image data to the SLM. The newly illuminated illuminator of the array 1 is thus imaged by each of the micro-lenses of the array 3 with a brightness which is controlled by the respective liquid crystal pixel of the SLM 4. These steps are then repeated until all of the illuminators of the array 1 have been illuminated and the corresponding $M_x \times M_y$ frames of image data have been presented to the SLM 4. This represents one complete image frame, and the process is then repeated.

The illuminators of the array 1 are contiguous with each other and each micro-lens of the array 3 forms contiguous images of the illuminators for a complete cycle of operation at the image plane 5. By appropriately selecting the dimensions of the apparatus, the sets of images formed by adjacent micro-lenses may also be arranged to be contiguous. Thus, the image for a complete cycle of operation is time-multiplexed but spatially fills the display area of the diffuser 5 to provide a complete image. Each pixel of the SLM 4 produces $M_x \times M_y$ pixels of the complete image so that the resolution of the SLM 4 is effectively increased from $N_x \times N_y$ to $[(N_x \times N_y) \times (M_x \times M_y)]$. In other words, the horizontal resolution is effectively increased by a factor of $M_x$ and the vertical resolution is effectively increased by a factor of $M_y$. The temporal multiplexing thus allows the resolution of the SLM 4 to be effectively increased without requiring the use of a higher resolution SLM which may be expensive or impossible to manufacture.

Figure 3:
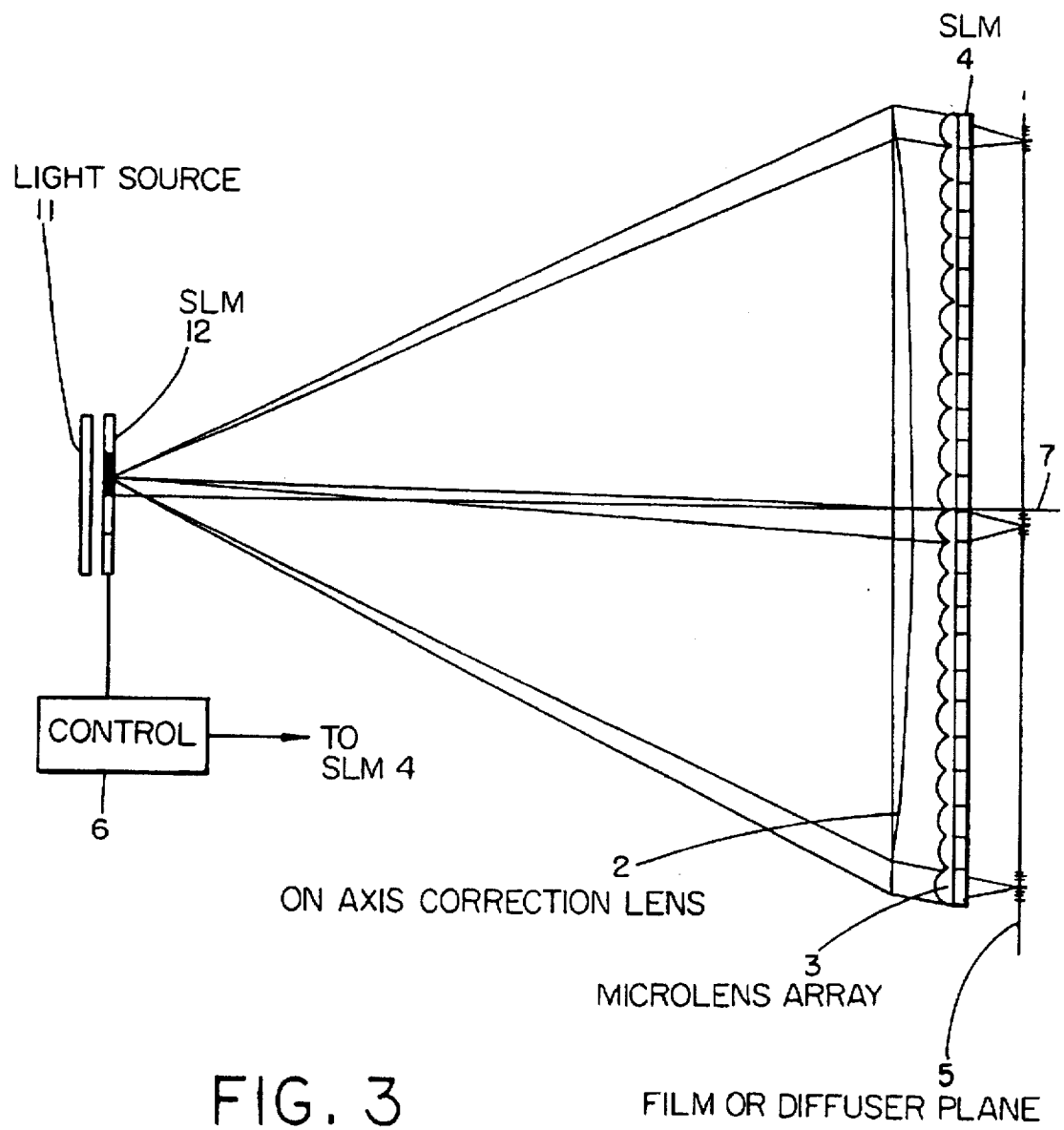
FIG. 3 is a diagrammatic cross-sectional view of an optical apparatus constituting a second embodiment of the invention.

The apparatus shown in FIG. 3 differs from that shown in FIGS. 1 and 2 in that the array of illuminators is shown as a two-dimensionally extended light source 11 behind a SLM 12. The light source 11 is continuously illuminated and the pixels of the SLM 12, which may be a liquid crystal device, are controlled so as to be transparent one at a time in a predetermined sequence by the control circuit 6. Thus, the light source 11 and the SLM 12 represent one possible form of the array 1 of the illuminators shown in FIG. 2.

Figure 4:
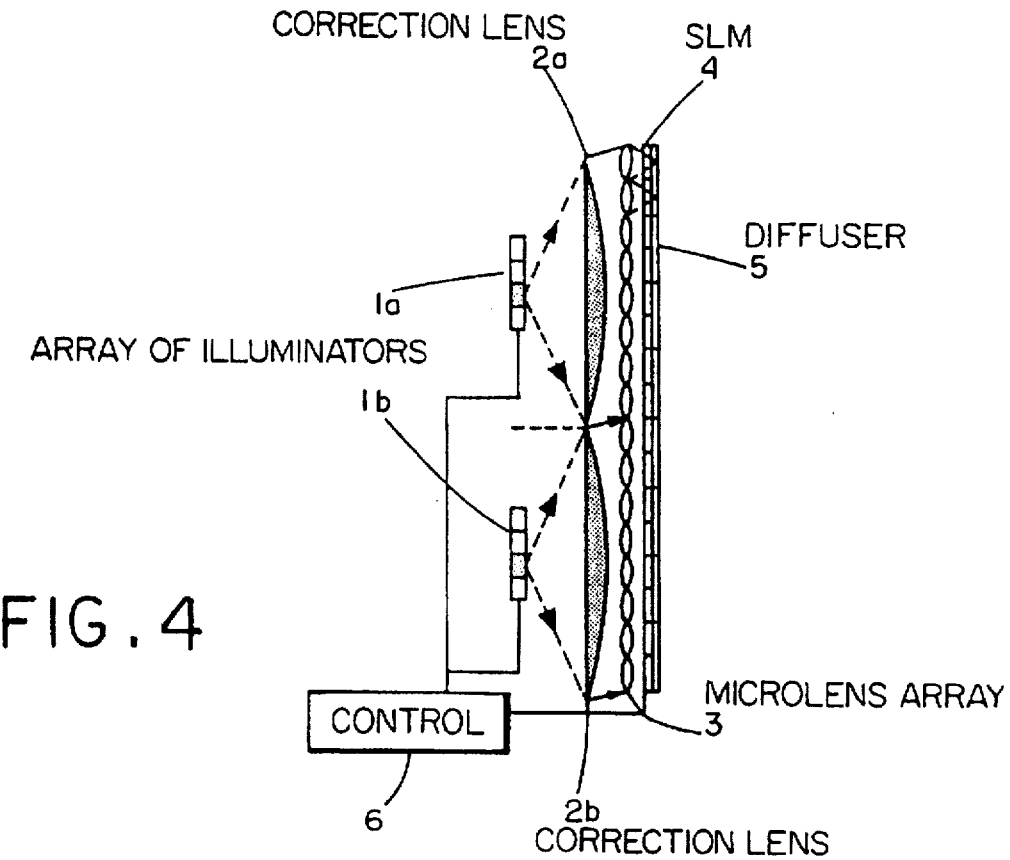
FIG. 4 is a diagrammatic cross-sectional view of an optical apparatus constituting a third embodiment of the invention.

FIG. 4 shows an apparatus which differs from that of FIG. 2 in that the microlens array 3 and the ELM 4 are illuminated by a plurality of identical arrays 1a and 1b of illuminators and correction lenses 2a and 2b, two arrays and two lenses being shown in FIG. 4. Thus, the size of the lenses 2a and 2b and their optical performance can be reduced compared with the lens 2 of the apparatus shown in FIG. 2. Operation of the apparatus shown in FIG. 4 is essentially the same as the operation of the apparatus shown in FIG. 2, the arrays 1a and 1b being controlled in synchronism by the control circuit 6.

Figure 5:
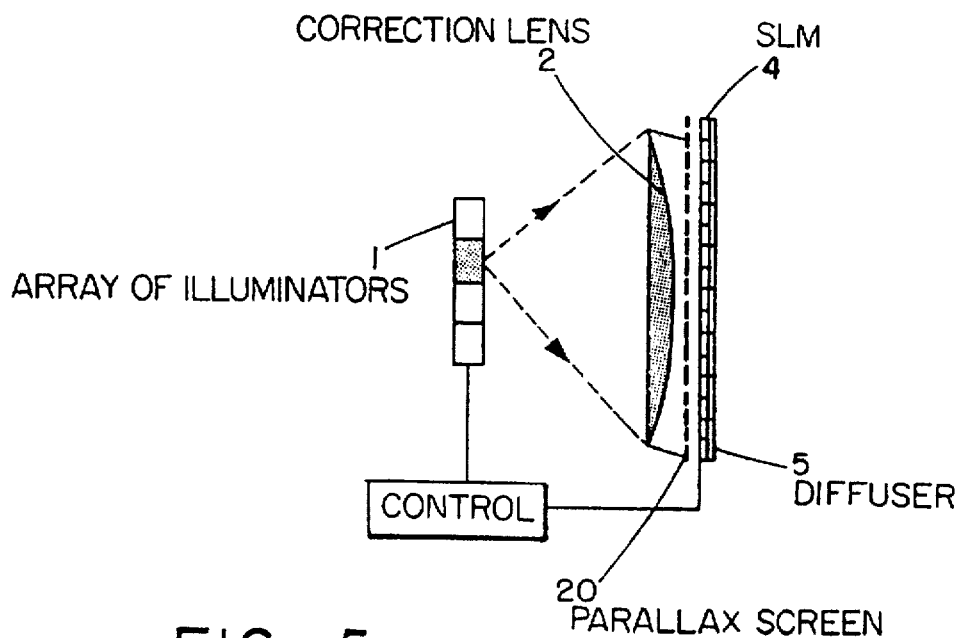
FIG. 5 is a diagrammatic cross-sectional view of an optical apparatus constituting a fourth embodiment of the invention.

The apparatus shown in FIG. 5 differs from that shown in FIG. 2 in that the microlens array 3 is replaced by a parallax screen 20. The parallax screen 20 comprises a two-dimensional array of $N_x \times N_y$ apertures, each of which is aligned with a respective liquid crystal pixel of the SLM 4. Operation of the parallax screen 20 is substantially the same as that of the microlens array 3 but without any optical aberrations which may be produced by refraction through the array 3. However, the amount of light passed by the screen 20 is substantially less than the amount of light passed by the microlens array 3.

Figure 6:
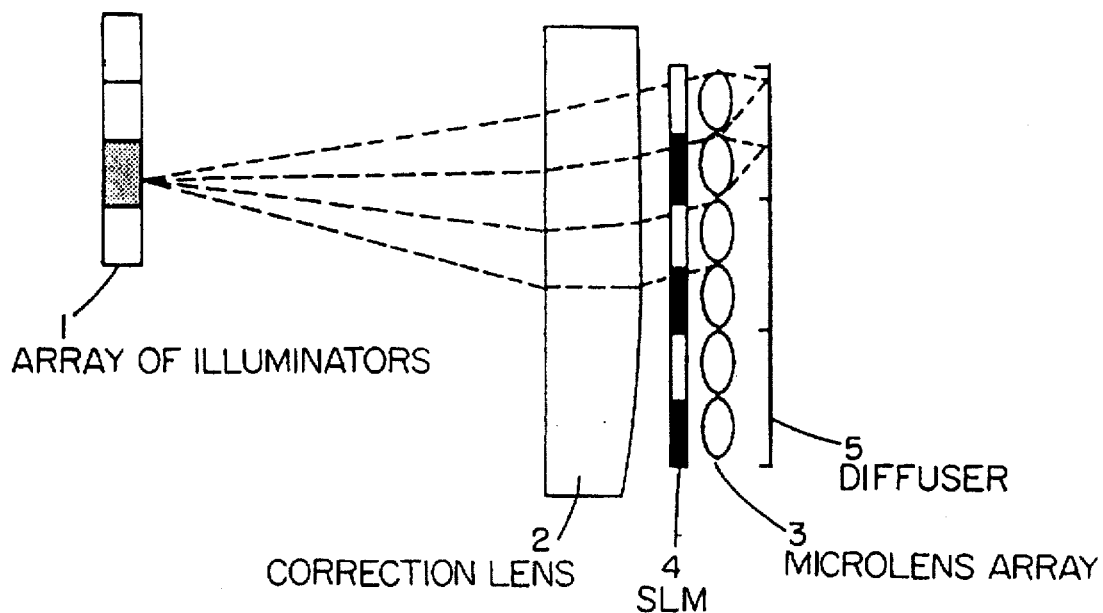
FIG. 6 is a diagrammatic cross-sectional view of part of an apparatus constituting a fifth embodiment of the invention.
Figure 7:
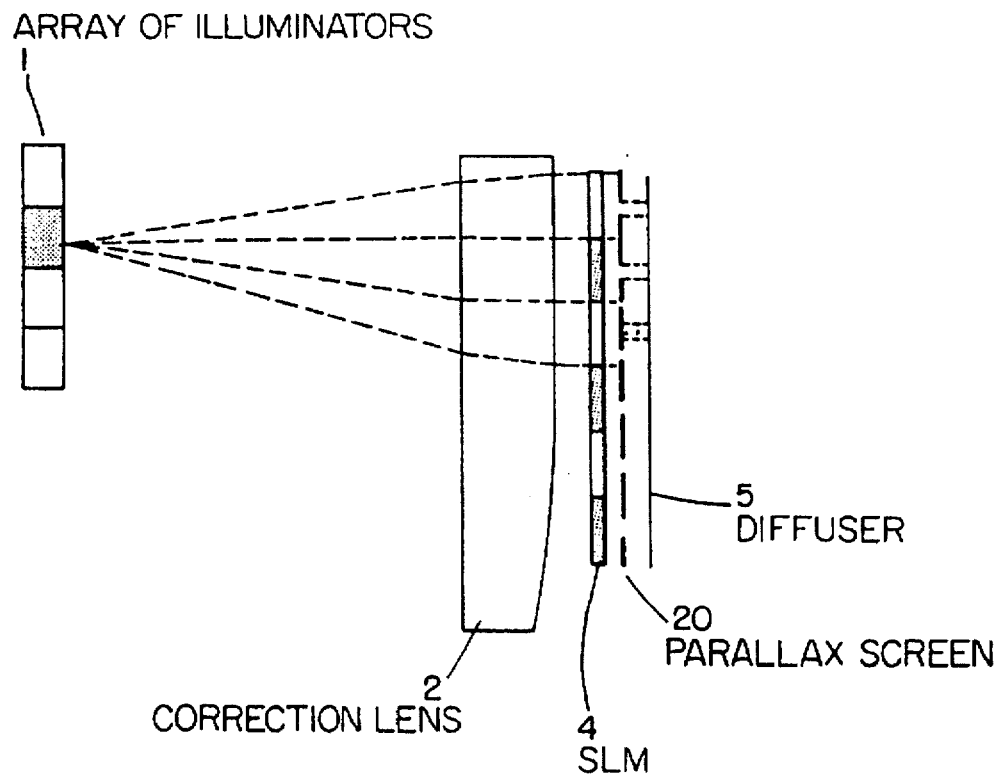
FIG. 7 is a diagrammatic cross-sectional view of part of an apparatus constituting a sixth embodiment of the invention.

FIG. 6 shows an apparatus which differs from that shown in FIG. 2 in that the positions of the microlens array 3 and the SLM 4 are reversed so that light from the correction lens 2 passes first through the SLM 4 and is then focused by the microlenses of the array 3 onto the diffuser 5. Although such an arrangement is substantially equivalent to the arrangement shown in FIG. 2, the arrangement shown in FIG. 2 may have an advantage in that crosstalk between the liquid crystal pixels may be reduced as compared with the arrangement shown in FIG. 6. Similarly, FIG. 7 shows an apparatus which differs from that shown in FIG. 5 in that the positions of the parallax screen 20 and the SLM 4 are reversed.

Figure 8:
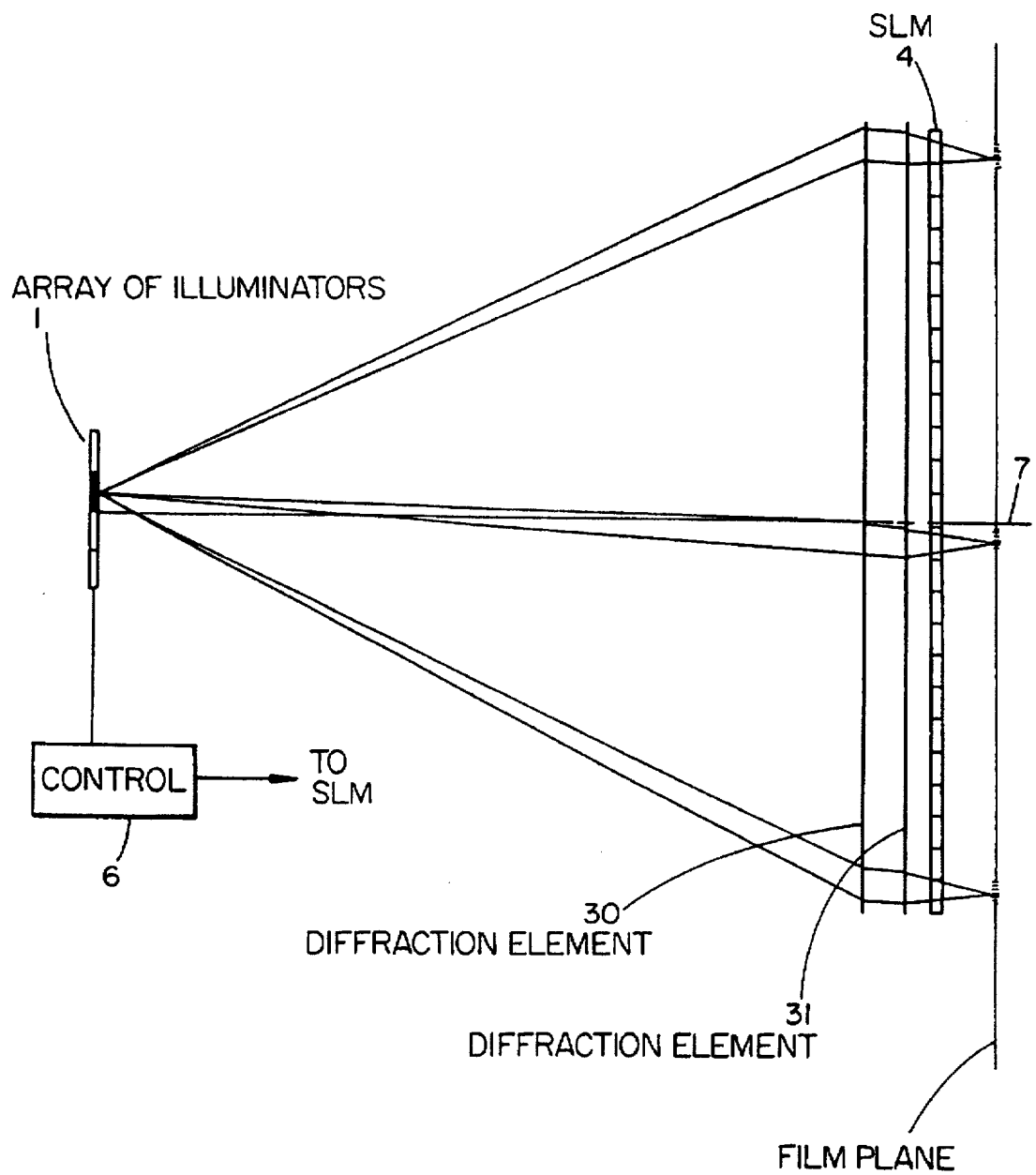
FIG. 8 is a diagrammatic cross-sectional view of an optical apparatus constituting a diagrammatic seventh embodiment of, the invention.

FIG. 8 shows an apparatus which is intended for use in printing applications, although it could be used to provide a monochromatic display. The apparatus of FIG. 8 differs from that shown in FIGS. 1 and 2 in that the array of illuminators 1 comprises an array of monochromatic illuminators. For instance, the array may comprise a surface emitting laser array. Alternatively, the array 1 may comprise a laser illuminated SLM.

The apparatus of FIG. 8 further differs from that shown in FIGS. 1 and 2 in that the correction lens 2 and the microlens array 3 are replaced by diffraction elements 30 and 31, respectively. The diffraction elements 30 and 31 are arranged to perform the functions of the correction lens 2 and the microlens array 3 for the monochromatic light provided by the array of illuminators 1. Thus, the diffraction elements 30 and 31 simulate the lenses and can be arranged to compensate for abberations such as astigmatism and coma. Alternatively, the diffraction elements 30 and 31 may be combined into a single diffraction element which performs the combined functions of the correction lens 2 and the microlens array 3.

The use of monochromatic light presents no disadvantage in printing applications and therefore permits the use of diffraction elements which can compensate for non-ideal imaging performance of the system in a manner which cannot be achieved by, for instance, using refractive elements such as microlenses.

Figure 9:
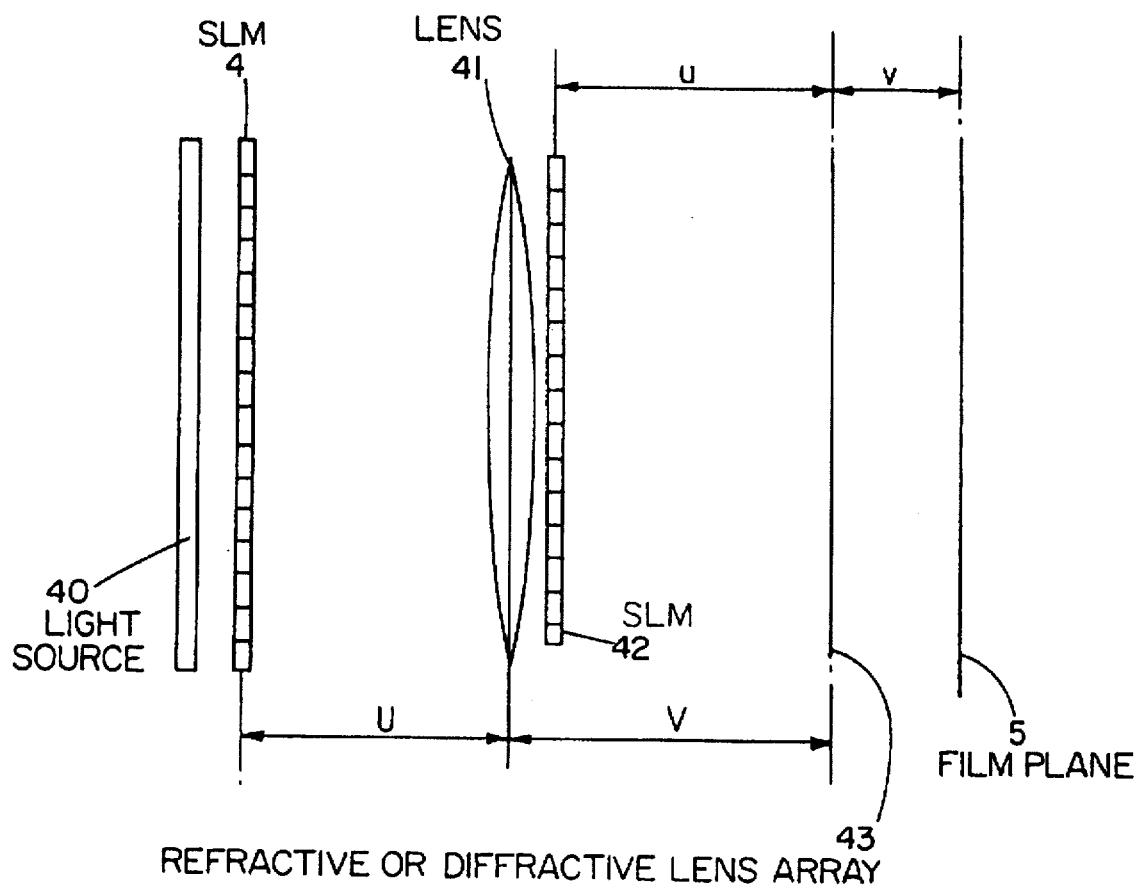
FIG. 9 is a diagrammatic cross-sectional view of an optical apparatus constituting an eighth embodiment of the invention.

FIG. 9 shows an apparatus which may be used for display or printing applications, a film plane 5 for printing applications being illustrated in the drawing. The apparatus comprises a diffuse monochromatic light source 40 disposed adjacent a SLM 4 which corresponds to the SLMs 4 in the other embodiments. An imaging system shown as a lens 41 is disposed between the SLM 4 and a further SLM 42, which corresponds in operation to the SLM 12 shown in FIG. 3. A refractive or diffractive lens array 43 is provided. The use of a monochromatic light source 40 permits a diffractive lens array to be used. However, a polychromatic light source may be used together with a refractive lens array as the element 43. The apparatus is shown for use in printing and includes a film plane 5. However, for display purposes, the film plane 5 may be replaced by a diffuser.

Operation of the apparatus shown in FIG. 9 is equivalent to operation of the apparatuses shown in the other drawings. The SLM 4 is evenly illuminated by the light source 40 and is presented consecutively with interlaced frames of image data. The SLM 4 is spaced from the lens 41 by a distance U and the lens 41 is spaced from the lens array 43 by a distance V such that:

$$(1/U)+(1/V)=1/F$$

where F is the focal length of the lens 41. Thus, the SLM 4 is imaged onto the lens array 43 such that each pixel of the SLM 4 is imaged on to a respective lens of the array 43. The arrangement of FIG. 9 is therefore optically equivalent to locating the SLM 4 adjacent the lens array 43.

The lens 41 is disposed as close to the SLM 42 as possible so as to provide uniform illumination. The SLM 42 is separated from the lens array 43 by a distance u and the lens array 43 is separated from the film plane 5 by a distance v such that:

$$(1/u)+(1/v)=1/f$$

where f is the focal length of the lenses of the array 43. The SLM 42 is thus imaged at the film plane 5 by the lens array 43. By controlling the SLM 42 such that each pixel is made transparent in sequence, the SLM 42 effectively acts as or simulates a light source of varying direction.

By imaging the pixels of the SLM 4 onto the lens array 43, problems caused by separation of these elements in the other embodiments are substantially eliminated.

In an alternative mode of operation, image data are supplied as consecutive interlaced frames to the SLM 42 and the pixels of the SLM 4 are made transparent one at a time in sequence so as to control direction of illumination. In the case of the embodiments shown in the other drawings, where the light source is similarly controllable and, for instance, comprises an illuminated SLM, the functions of image display and control of direction of illumination may similarly be inverted.

When the light source 40 is monochromatic, the lens 41 may be replaced by an equivalent diffractive element.

It is thus possible to provide an arrangement in which the resolution of a SLM is effectively enhanced without any penalty with regard to manufacturing yield. The enhanced resolution thus obtained may be used to enhance the resolution of the image displayed or printed. However, the enhanced resolution may be used for other purposes. For instance, the spatial resolution may be sacrificed in favour of the provision of or the improvement in grey scale capability of the displayed or printed image. By allocating several of the effective picture elements at the image plane 5 to each actual picture element of the image to be displayed, grey scale capability may be provided for a SLM of the type which does not have grey scale capability. Alternatively, the grey scale capability of a SLM which has limited grey scale capability may be enhanced.

Similarly, spatial resolution may be sacrificed in favour of the provision or enhancement of colour capability in the displayed or printed image. For instance, the illuminators of the array 1 may provide light of different colours, for instance red, green, and blue, so that RGB pixels can be allocated to each pixel of the displayed or printed image. Further, the provision or improvement of grey scale capability and colour capability may be combined by sacrificing spatial resolution.

The apparatuses shown in the drawings provide enhanced resolution both vertically and horizontally. However, where enhanced resolution is required in only one dimension, the two-dimensional array 1 of illuminators may be replaced by a one dimensional line array. Further, the microlens array may be replaced by a lenticular screen of cylindrically converging lenticules or the apertures in the parallax screen may be replaced by elongate slits. Further; for applications where a substantially one-dimensional image is required, the two-dimensional SLM may be replaced by a one-dimensional line array of pixels. For instance, such an arrangement may be used to provide a printer which prints one line of pixels at a time on a photographic emulsion with the emulsion being moved perpendicularly to the axis of the array for consecutive printing of lines of pixels.

When the apparatus is used as a real time display with a diffuser at the image plane, the frame or "refresh" rate of display of images forming a complete image frame should be sufficiently high to avoid perceptible flicker in the displayed image. Thus, a suitably fast liquid crystal device should be used for the SLM. As mentioned hereinbefore, ferroelectric liquid crystal devices may be preferable because of their high switching speed. Such a display may be used to display still images or moving images, depending on the image data supplied to the apparatus. It is thus possible to provide a relatively large high resolution image without the problems associated with increasing the resolution of liquid crystal devices.

For printing applications, it is possible to obtain a relatively large image of increased resolution while using a SLM of substantially conventional type. For large SLMs, it is possible to avoid the need for mechanical movement during printing so that the printing apparatus can be simplified and its cost reduced.

What is claimed is:

1. An optical apparatus comprising a first spatial light modulator having a plurality of individually controllable pixels, an array of imaging elements, a plurality of light sources, and an image surface, wherein each of the imaging elements of the array is arranged to form an image of each of the plurality of light sources through a corresponding pixel of the spatial light modulator at a respective position on the image surface, and optical paths of each of the images of the plurality of light sources are overlapping through the respective pixels.

2. An apparatus as claimed in claim 1 further comprising collimating means for collimating light from the light sources onto the array of imaging elements.

3. An apparatus as claimed in claim 2, wherein the collimating means comprises a converging lens with the plurality of light sources disposed substantially in the focal plane thereof.

4. An apparatus as claimed in claim 3, wherein the light sources are monochromatic and the converging lens is a diffractive element.

5. An apparatus as claimed in claim 1, wherein the first spatial light modulator comprises a plurality of picture elements, each of which corresponds to and is substantially aligned with a respective imaging element of the array.

6. An apparatus as claimed in claim 1, wherein the plurality of light sources are arranged as an array of light sources extending substantially perpendicularly to an optical axis of the apparatus.

7. An apparatus as claimed in claim 6, wherein the array of light sources is a one dimensional array.

8. An apparatus as claimed in claim 6, wherein the array of light sources is a two dimensional array.

9. An apparatus as claimed in claim 6, wherein each of the light sources is contiguous with the adjacent light source.

10. An apparatus as claimed in claim 6, wherein the array of light sources comprises a further spatial light modulator having a plurality of elements and continuous illumination means disposed behind the further spatial light modulator.

11. An apparatus as claimed in claim 10, wherein the further spatial light modulator is a liquid crystal device.

12. An apparatus as claimed in claim 6, wherein the light sources include at least one light source of a first color and at least one light source of a second color.

13. An apparatus as claimed in claim 1, wherein the image surface is a plane surface.

14. An apparatus as claimed in claim 1, wherein the array of imaging elements comprises a one dimensional array.

15. An apparatus as claimed in claim 1, wherein the array of imaging elements comprises a two dimensional array.

16. An apparatus as claimed in claim 1, wherein the array of imaging elements is an array of lenses.

17. An apparatus as claimed in claim 16, wherein the lenses of the array are converging lenses.

18. An apparatus as claimed in claim 16, wherein the array of lenses comprises a microlens array.

19. An apparatus as claimed in claim 18, wherein the lenses of the microlens array are spherically converging.

20. An apparatus as claimed in claim 16, wherein the array of lenses comprises a lenticular screen.

21. An apparatus as claimed in claim 20, wherein the lenticules of the lenticular screen are cylindrically converging.

22. An apparatus as claimed in claim 16, wherein the light sources are monochromatic and the array of lenses comprises an array of diffractive elements.

23. An apparatus as claimed in claim 1, wherein the array of imaging elements is a parallax barrier defining an array of apertures.

24. An apparatus as claimed in claim 1, wherein the first spatial light modulator comprises a liquid crystal device.

25. An apparatus as claimed in claim 1, wherein the image surface comprises a diffuser.

26. An apparatus as claimed in claim 1, further comprising means for supporting a light-sensitive film at the image surface.

27. An optical apparatus comprising a first spatial light modulator, an array of imaging elements, a light source for illuminating the first spatial light modulator, imaging means, a second spatial light modulator, and an image surface, wherein the imaging means is arranged to form an image of the first spatial light modulator on the array of imaging elements via the second spatial light modulator and each of the imaging elements of the array is arranged to form an image of the second spatial light modulator at a respective position on the image surface.

28. An apparatus as claimed in claim 27, wherein the first spatial light modulator comprises a plurality of picture elements and the imaging means is arranged to form an image of each of the picture elements on a respective imaging element of the array.

29. An apparatus as claimed in claim 27, wherein the second spatial light modulator comprises a liquid crystal device.

30. An apparatus as claimed in claim 27, wherein the image surface is a plane surface.

31. An apparatus as claimed in claim 27, wherein the array of imaging elements comprises a one dimensional array.

32. An apparatus as claimed in claims 27, wherein the array of imaging elements comprises a two dimensional array.

33. An apparatus as claimed in claim 27, wherein the array of imaging elements is an array of lenses.

34. An apparatus as claimed in claim 33, wherein the lenses of the array are converging lenses.

35. An apparatus as claimed in claim 33, wherein the array of lenses comprises a microlens array.

36. An apparatus as claimed in claim 35, wherein the lenses of the microlens array are spherically converging.

37. An apparatus as claimed in claim 33, wherein the array of lenses comprises a lenticular screen.

38. An apparatus as claimed in claim 37, wherein the lenticules of the lenticular screen are cylindrically converging.

39. An apparatus as claimed in claim 33, wherein the light sources are monochromatic and the array of lenses comprises an array of diffractive elements.

40. An apparatus as claimed in claim 27, wherein the array of imaging elements is a parallax barrier defining an array of apertures.

41. An apparatus as claimed in claim 27, wherein the first spatial light modulator comprises a liquid crystal device.

42. An apparatus as claimed in claim 27, wherein the image surface comprises a diffuser.

43. An apparatus as claimed in claim 27, further comprising means for supporting a light-sensitive film at the image surface.

* * * * *